(12) United States Patent
Zhang et al.

(10) Patent No.: US 9,701,289 B2
(45) Date of Patent: Jul. 11, 2017

(54) METHOD FOR DETERMINING A VEHICLE REFERENCE SPEED AND VEHICLE CONTROLLER HAVING SUCH A METHOD

(71) Applicant: Continental Teves AG & Co. oHG, Frankfurt (DE)

(72) Inventors: Chen Zhang, Frankfurt am Main (DE); Julien Levrier, Ludwigsburg (DE); Philipp Keβler, Mainz (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 14/768,801

(22) PCT Filed: Mar. 24, 2014

(86) PCT No.: PCT/EP2014/055854
§ 371 (c)(1),
(2) Date: Aug. 19, 2015

(87) PCT Pub. No.: WO2014/154639
PCT Pub. Date: Oct. 2, 2014

(65) Prior Publication Data
US 2015/0375719 A1    Dec. 31, 2015

(30) Foreign Application Priority Data

Mar. 25, 2013  (DE) .......................... 10 2013 205 245

(51) Int. Cl.
*B60T 8/172* (2006.01)
*B60T 8/175* (2006.01)

(52) U.S. Cl.
CPC .............. *B60T 8/172* (2013.01); *B60T 8/175* (2013.01); *B60T 2250/042* (2013.01); *B60T 2270/86* (2013.01)

(58) Field of Classification Search
CPC ........ B60T 8/172; B60T 8/173; B60T 8/1755; B60W 20/00; B60W 30/18
(Continued)

(56) References Cited

U.S. PATENT DOCUMENTS 6,816,804 B1  11/2004  Lee
8,050,838 B2  11/2011  Ryu
(Continued)

FOREIGN PATENT DOCUMENTS

DE         4314830        11/1994
DE       102004060677      6/2006
(Continued)

OTHER PUBLICATIONS

German Search Report for German Application No. 10 2013 205 245.6 mailed Nov. 11, 2013, including partial translation.
(Continued)

*Primary Examiner* — Thomas G Black
*Assistant Examiner* — Wae Louie
(74) *Attorney, Agent, or Firm* — RatnerPrestia

(57) ABSTRACT

A method for determining a vehicle reference speed and a vehicle controller having such a method, in which directly or indirectly determined or estimated vehicle status signals, including weighting factors associated with each of the vehicle status signals, are merged in a merging module, wherein the merging module includes at least two stochastic estimators, which exchange signals with one another that correspond to physical vehicle parameters, wherein the association of the estimators is selected in accordance with a physics model for the vehicle behavior.

12 Claims, 1 Drawing Sheet

(58) Field of Classification Search
USPC .................................... 701/70, 22, 29.1, 68
See application file for complete search history.

(56) References Cited

U.S. PATENT DOCUMENTS

| | | | |
|---|---|---|---|
| 8,473,174 B2 | 6/2013 | Kroeger | |
| 8,855,848 B2 | 10/2014 | Zeng | |
| 2013/0184928 A1* | 7/2013 | Kerkhof | G07C 5/0808 701/29.1 |
| 2013/0191000 A1* | 7/2013 | Hahne | G08G 1/096725 701/70 |
| 2014/0180521 A1* | 6/2014 | Tsuchikawa | B60K 6/48 701/22 |
| 2014/0200781 A1* | 7/2014 | Yokokawa | F16D 48/06 701/68 |
| 2015/0251658 A1* | 9/2015 | Kato | B60L 3/102 701/22 |
| 2015/0314759 A1* | 11/2015 | Nicolet | B60T 8/1755 701/70 |
| 2015/0375719 A1* | 12/2015 | Zhang | B60T 8/172 701/70 |

FOREIGN PATENT DOCUMENTS

| | | |
|---|---|---|
| DE | 102006023574 | 11/2007 |
| DE | 102007015066 | 10/2008 |
| DE | 102008026397 | 1/2009 |
| DE | 102008045619 | 3/2010 |
| DE | 10259272 | 5/2012 |
| EP | 1719676 | 11/2006 |
| FR | 2932878 | 12/2009 |
| FR | 2932892 | 12/2009 |
| WO | 02103366 | 12/2002 |
| WO | 2011023591 | 3/2011 |

OTHER PUBLICATIONS

International Search Report for International Application No. PCT/EP2014/055854 mailed Jun. 23, 2014.

Khan, U.A. et al., "Distributing the Kalman filter for large-scale systems," Oct. 1, 2008, pp. 4919-4935, vol. 56, No. 10, IEEE Transactions on Signal Processing.

* cited by examiner

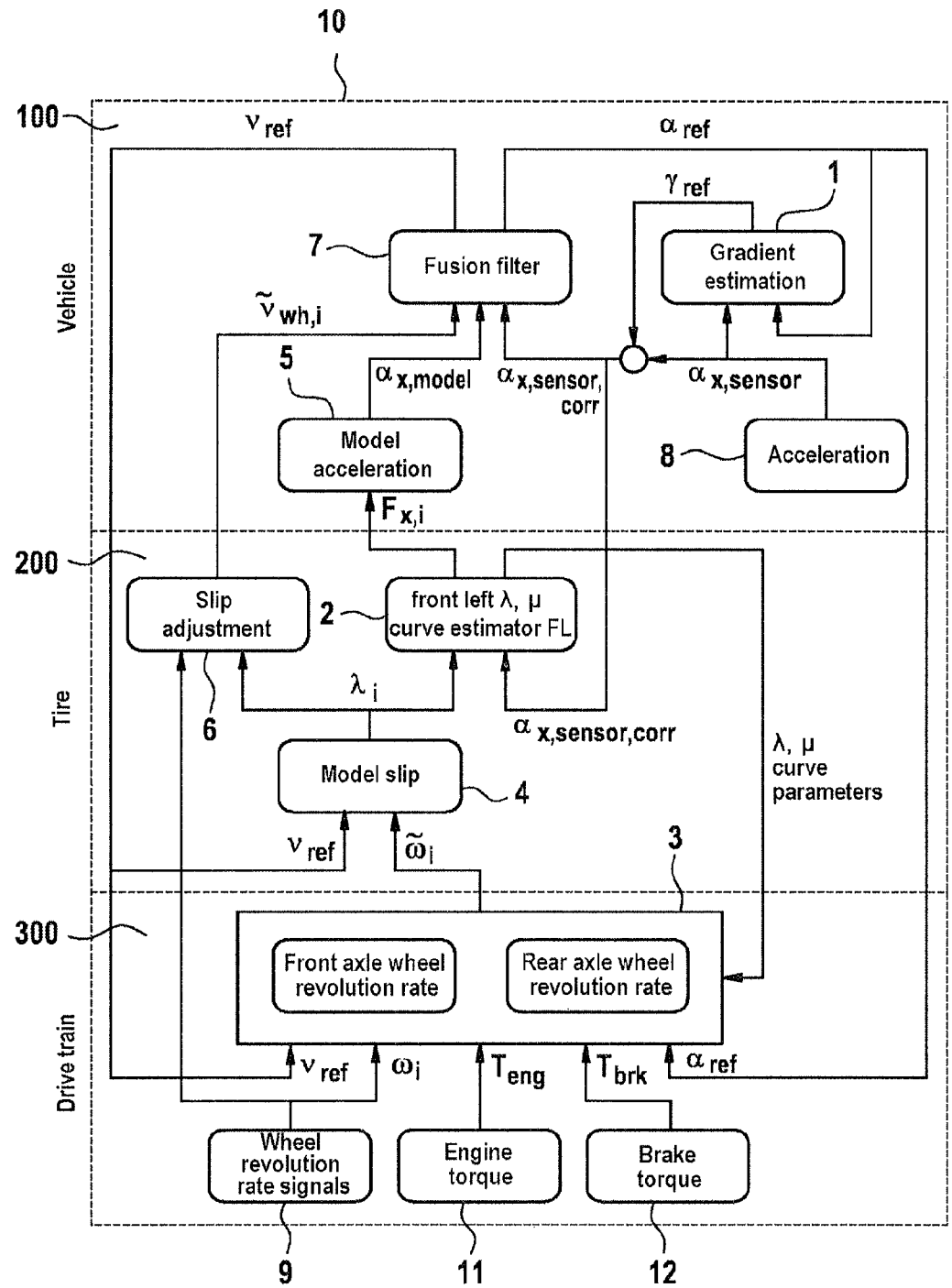

METHOD FOR DETERMINING A VEHICLE REFERENCE SPEED AND VEHICLE CONTROLLER HAVING SUCH A METHOD

CROSS REFERENCE TO RELATED APPLICATIONS

This application is the U.S. National Phase Application of PCT/EP2014/055854, filed Mar. 24, 2014, which claims priority to German Patent Application No. 10 2013 205 245.6, filed Mar. 25, 2013, the contents of such applications being incorporated by reference herein.

FIELD OF THE INVENTION

The invention concerns a vehicle reference speed determination method.

BACKGROUND OF THE INVENTION

Various methods are already known for determining a reliable vehicle reference speed in motor vehicle brake control systems, drive slip controllers and driving dynamics controllers for motor vehicles.

According to DE 43 14 830 A1, which is incorporated by reference, this is based solely on an analysis of wheel speeds. If further sensors are available in the vehicle, the same can also be used for reference speed determination. WO 02/103366, which is incorporated by reference, thus discloses the determination of the vehicle reference speed in an ESP/ESC controller by means of a longitudinal acceleration sensor, the wheel revolution rate sensors and the position determination by means of a GPS sensor. DE 10 2008 045 619 A1, which is incorporated by reference, also processes the position information determined by means of a camera. A determination method emerges from DE 10 2004 060 677 A1, which is incorporated by reference, in which the speed over the ground is determined by means of an optical method. WO 2011 023 591 A1 and DE 10 259 272 A1, which are incorporated by reference, are concerned with the combination of wheel speed information, a model for the longitudinal acceleration and a wheel dynamics model. The wheel dynamics model and the longitudinal acceleration model estimate or determine the acceleration of the vehicle based on the wheel displacement.

With a method purely based on slip-free rolling wheels of the non-driven axle, situations can arise in which the vehicle speed cannot be correctly determined. A vehicle reference speed signal is then not representative of the actual vehicle speed during some braking processes or in a case of drive slip. This problem exists more particularly in all-wheel drive vehicles in case of drive slip or drag torque. This can often result in the estimated speed being underestimated in the braking situation for all types of vehicle and overestimated in the drive situation for all-wheel drive vehicles.

By including the acceleration signal and engine torque it is possible to make the estimated speed plausible. However, the engine torque signal is not always available in a braked situation, because the engine can be decoupled. In addition, the drag torque signal does not have a comparable high quality to the engine torque signal in the drive situation. Moreover, the engine torque cannot be fully transferred to the road, because the wheels can spin or lock. On the other hand, the acceleration signal of the inertial sensor system is subject to offset because of the long-term drift, the assembly inaccuracies and the road gradient. In addition the signal is affected by noise from axle oscillation and deceleration caused by inertia. There is no equivalent redundancy for the acceleration sensor.

The aforementioned DE 10 259 272 A1 is concerned with the problem of the fusion of signals having different reliability.

According to the described method, the vehicle speed is determined by including a plurality of available sensor signals whose influence on the computing result depends on weighting factors.

SUMMARY OF THE INVENTION

An aspect of the present invention provides a particularly accurate, robust and reliable vehicle reference speed determination method using a fusion method with weighting factors based on wheel revolution rate information including additional driving status sensors, such as for example a longitudinal acceleration sensor or brake pressure.

According to the vehicle reference speed determination method according to an aspect of the invention, driving status signals are fused with each other, wherein the inclusion of weighting factors associated with each driving status signal is carried out. For this not every signal has to comprise a weighting factor. However, it is usually the case and is moreover particularly advantageous.

The signals are for example physical driving states or driving parameters, which originate directly or indirectly from sensors or which are determined or estimated indirectly by processing other signals.

By the method described above it is possible to perform a particularly accurate wheel slip calculation, whereby driving dynamics controllers, drive slip controllers and brake controllers that make recourse to the vehicle reference speed determination method according to the invention can be significantly improved.

According to a particularly preferred embodiment, the invention is thus concerned with a method for determining the driving state, in particular the vehicle speed, the acceleration and the road gradient by means of a hierarchical structure of stochastic estimators.

The fusion model is preferably divided or subdivided into at least two hierarchically structured model calculation levels, wherein each model calculation level models a sub region of a vehicle and in particular every level comprises at least one stochastic estimator.

The model calculation levels are particularly preferably divided into the following levels
vehicle model,
tire model and
drive train model
wherein the vehicle model is most particularly preferably a longitudinal dynamic model of the vehicle.

Moreover, the invention comprises the preferred embodiments A) to F) described below:

A) Method for Vehicle Speed Estimation

According to the method described here, a model-based reference vehicle speed estimation is carried out using models on three levels (a1 to a3).

a1) Method for simulating a drive train (drive train model)
Simulating by computer simulation is carried out by including engine torque, brake torque and drive train components (engine, clutch, transmission, differential, wheels).

a2) Method for simulation (computer simulation) of a tire characteristic ($\mu$ over the slip curve, so-called tire characteristic model)

For determining the characteristic parameters the fusion model preferably comprises, besides stochastic estimators, in addition at least one other stochastic estimator, in particular operating according to the least squares method, and/or a physical computer model. The least squares method is advantageously a recursive least squares method.

a3) Longitudinal vehicle model, in particular based on a vehicle acceleration or deceleration model.

The longitudinal vehicle model comprises at least one fusion filter. A known stochastic estimator, such as for example a Kalman filter, advantageously comes under consideration as the fusion filter.

B) Hierarchical State Estimation Structure with a Plurality of Stochastic State Estimators on Three Levels (b1-b3)

b1) Drive train model level:

According to each alternative preferred embodiment, a drive train model for the axles is provided in each case, wherein the speeds of the wheels on the different axles are processed therewith. For estimating the state it is thus possible to carry out a division of the model into the two axles of a motor vehicle. In other words, in each case a state estimator is then solely responsible for one axle, in general there being an estimator for the front axle and an estimator for the rear axle.

Alternatively, it is also possible to use a general solution for all possible types of drive in vehicles including the braking state. In this case each state estimator has a drive torque and a brake torque as inputs. For example, in the case of a vehicle only driven at two wheels or one axle, only the state estimator for the driven axle is supplied with a positive driving torque, whereas the state estimator for the non-driven axle is supplied with zero drive torque. In the case of an all-wheel drive vehicle, each axle receives a partial drive torque. During a braking process each axle is supplied with a negative brake torque.

b2) Tire model level for determining the tire/road contact

A wheel-specific slip curve estimation is preferably used for determining the parameters of the tire characteristics. This is carried out in particular by estimation according to a recursive least squares method. During said estimation, the maximum available coefficients of friction and tire stiffnesses are advantageously included in the calculation.

b3) Vehicle model level

According to a preferred embodiment, the driving status signals are formed from the following signal sources:

ESC driving state sensors, such as preferably
    i) wheel speeds ($\omega_i$) and
    ii) vehicle longitudinal acceleration ($a_{x,sensor}$).

In particular these comprise
the vehicle longitudinal speed ($v_{ref}$)
the vehicle longitudinal acceleration ($a_{ref}$) and the road gradient angle ($\gamma_{ref}$).

According to another preferred embodiment, a determination of the vehicle speed and vehicle longitudinal acceleration is carried out, comprising at least the following parts:

A stochastic estimator with linear dynamics for the fusion of a measured vehicle acceleration, in particular compensated for long-term offset and gradient,
a vehicle acceleration calculated from the model, and
four wheel speeds adjusted for slip.

Determining a model vehicle acceleration $a_{x,model}$ is preferably carried out at the vehicle model level based on the circumferential forces from the tire characteristics and the vehicle mass resulting from a vehicle longitudinal model.

Particularly preferably, a separate estimator for the gradient angle and a separate estimator for the overall vehicle are preferably used here.

According to a preferred embodiment, a stochastic estimation of the measured vehicle acceleration and the estimated vehicle acceleration is preferably carried out in this way for determining the vehicle gradient.

C) Modeling the System Noise and Measurement Noise c1) According to a preferred embodiment, a model-based derivation of the measurement noise from the stochastic fusion filter is carried out at the lower model level of the drive train b1) from the uncertainties of the filter.

c2) Furthermore, according to a likewise preferred embodiment of the method, modeling of the measurement noise including vehicle properties can be carried out, such as in particular at least including the vehicle mass, the inertias and the transient response.

c3) According to another preferred embodiment, finally a situation-dependent model-based determination of the system noise can also be performed.

D) Dimension Reduction of the Individual Estimators (by Dividing a Whole Filter into a Plurality of Estimators) and the Associated Reduction of the Computing Load and the RAM/ROM Resources as well as Greater Accuracy E) Redundancy for temporary failure of the longitudinal acceleration sensors F) Exclusive Use of Standard ESC Sensors, such as: Wheel Revolution Rates, Longitudinal Acceleration Sensor, Engine Torque and Brake Pressures, wherein the Brake Pressures can be Determined by Sensors or can even be Determined on a Model Basis.

This gives the advantage that the method can be particularly simply implemented in standard ESP/ESC brake controllers.

The method according to the invention is preferably programmatically implemented in purely fixed point arithmetic using mathematical calculations. This is above all possible by dimension reduction that is achieved according to the invention. This results in a high processing speed, in particular on computer systems with relatively low processing speeds, as is often the case in typical motor vehicle controllers.

The redundant processing of physical driving state variables that are estimated or determined by sensors that is preferably carried out according to the invention results in an overall greater robustness to sensor failures or erroneous sensor signals of the calculation method.

Because of the multi-hypothesis tracking strategy by means of stochastic signal processing that is used according to a preferred embodiment, an improved probability of success results compared to the simple switching between signals (e.g. wheel speeds).

BRIEF DESCRIPTION OF THE DRAWING

Other preferred embodiments emerge from the dependent claims and the following description of an exemplary embodiment using a FIGURE.

In the FIGURE

FIG. 1 shows a representation of a vehicle reference speed determination method with a division into a plurality of interconnected stochastic estimators.

DETAILED DESCRIPTION OF THE INVENTION

In FIG. 1 an estimator 10 for determining the vehicle reference speed is shown with the main calculation blocks, such as can be used in an electronic vehicle controller, such as for example in an ESC/ESP brake controller or a vehicle central computer. The electronic controller receives signals from vehicle sensors that are connected thereto or contained within the controller, such as wheel revolution rate sensors, a yaw rate sensor or a longitudinal acceleration sensor and processes said signals in a microcontroller. Because of the internal digital signal processing, discrete Kalman filters are therefore particularly advantageous for the fusion of states.

The estimator 10 is a hierarchical filter formation with three levels. The state space model can be expressed for an all-wheel drive vehicle or for a two-wheel drive vehicle by a general state equation producing a mathematical relationship between the wheel speeds per wheel $\omega_i$ (i=1 to 4), the vehicle speed $v_x$ and the acceleration $a_x$ in the longitudinal direction (x) of the vehicle.

The estimator 10 processes the following digitally converted sensor signals:
$\omega_i$=wheel revolution rate signals 9 (referred to as RDF in FIG. 1),
$a_{x,sensor}$=acceleration sensor signal 8,
$T_{eng}$=engine torque signal 11 and
$P_{THZ}$=driver's initial pressure 12 (THZ, "brake torque" box in FIG. 1).

The observation of the above-mentioned computing-intensive state equation is divided in the estimator 10 into three independent calculation levels, each of which can be considered as an independent vehicle model:
tire model 200 including $\lambda,\mu$ curve estimator 2 for determining the slip characteristic,
drive train model 300 including wheel dynamics model 3 and
longitudinal dynamics model 100 of the vehicle.

The method according to the example can be understood as a subdivided, in particular at least partially hierarchically structured, structure of stochastic estimators. Thus an observer at a higher level can combine and assess the information at the lower levels. The resulting hierarchical structure has the advantage that task separation is carried out. The lower estimator of such a structure produces pre-filtering, whereas the upper level is responsible for the fusing. There can be an adaptive self-organization of the "top-down" and "bottom-up" influences. In addition, the estimators in the lower levels profit from the "top-down" influence of the hierarchical structure. This means that the lower levels can use the predictions of the upper levels, which can produce more accurate results, for example because of the higher information content of the plurality of inputs or of the more accurate model. Furthermore, the priorities determined in the upper levels can be handed down to support the lower observer with a more specific view of things. For the upper levels, by contrast, the "bottom-up" influence is important because the upper levels only have to manage the predictions of the lower levels that they receive as a measurement.

A stochastic estimator is for example a known Kalman filter, in particular a discrete Kalman filter. With said filter it is possible to fuse together both measurement signals determined by sensors (e.g. measurement variables of physical driving states, such as for example the longitudinal acceleration measured with a longitudinal acceleration sensor), and also so-called pseudo-measurement signals (e.g. physical driving state variables that are calculated or estimated from or with other signals) with simultaneous weighting depending on the fuzziness of the estimated signals (confidence intervals or "quality"). In order to always be able to include the signal quality during the processing of the signals, the transfer of the signals is preferably carried out by transferring or handing over the current signal value to the next computing module together with the current quality of the signals currently being transferred.

Because a discrete Kalman filter is a filter that is particularly suitable for linear equation systems, it is advantageous to perform a linearization in the region of the working point, for example by the particularly preferred use of an extended Kalman filter (EKF) or of an "unscented" Kalman filter (UKF). For an implementation in a vehicle controller, extended Kalman filters are more particularly to be preferred because the same have advantages related to the necessary capacity of the physical computers (resources) used.

The modeling of the tire road contact results in a nonlinear overall system, which can only be treated numerically with a relatively high computing time requirement. It can therefore be advantageous not to carry out the exclusive use of simple Kalman filters that are primarily conceived for linear systems. It has been shown that EKF filters are particularly suitable for the purpose described here, because it is possible using said filters to linearize the system about the current working point.

Another possibility of dealing with the nonlinearity of the system is the use of a UKF filter.

The stochastic estimators used in the example comprise at least the components 1) to 7) described below. Said numbering should not be understood as a limitation of the example of the invention. Rather, it is possible to remove individual components or to add further components depending on the current requirements.

Because of the difference of the wheel dynamics and vehicle dynamics, for example the estimation of the reference speed and the vehicle acceleration is separated from the estimation of the angular speeds. The aim is the estimation of the vehicle reference speed, therefore the estimator for the same is placed in the upper level. In order to further simplify the model of the angular speeds, there is a division into front and rear axles. The choice of said configuration has the advantage, in contrast to the division into the left and right wheels, that the wheels on both axles are strongly coupled to each other.

An estimator formed in this way is relatively accurate and comprises no particular numerical problems as a result of excessively different dynamics. In contrast to an estimator for the complete model, the division and the self-organizing structure also give the advantage of an easier ability to parameterize. The division into front and rear axles also enables the observer to more easily configure for other types of vehicle. Thus all in all the design of the estimator 10 facilitates an implementation in a vehicle computer.

At the lower level 300 there are two EKF filters 3, which estimate the slip-affected angular speeds $\omega_{FL}$ and $\omega_{FR}$ at the front axle and $\omega_{RL}$ and $\omega_{RR}$ at the rear axle. The estimators use as inputs the driving torque of the engine $T_{eng}$ 11 as well as the brake torques $T_{brk}$ 12. The brake torques can be calculated from the brake pressures of the vehicle brake system.

When using modeling of a vehicle with two drive units, the estimator of the front axle uses the engine torque of the front engine and the estimator of the rear axle uses the engine torque of the rear engine. Likewise, the brake torques are divided as a result of the separation of the connection between the axles.

At the upper level 100 there is a Kalman filter 7 that is used as a fusion filter. It estimates the speed $v_{ref}$ and the acceleration $a_{ref}$ of the vehicle. There is thus a total of three estimators in use in the illustrated example, one for the dynamics of the front axle, one for the dynamics of the rear axle and one for the overall dynamics of the vehicle. In the lower part of level 100 there is a block 5 for producing pseudo measurements for the acceleration in the form of the four slip-compensated wheel speeds that are made available to the fusion filter. Furthermore, the same uses the measurement signal of the acceleration sensor a of Block 8. In order to be able to exploit the strengths of a hierarchical structure, the standard deviations determined by the filters of the lower level are forwarded to the fusion filters. Moreover, the estimators for the front and rear axles exchange their estimates with each other and use the estimation of the speed and acceleration of the fusion filters as an input. When modeling a vehicle with two drive units, the use of the estimates of the lower level among themselves is omitted.

1) "Gradient Angle Estimator" Component

From the determined vehicle reference acceleration $v_{ref}$ as well as the measured acceleration $a_{ref}$ from 7 and the measured acceleration $a_{x,sensor}$ from 10, a road gradient angle $\gamma_{ref}$ is estimated by means of a stochastic filter.

2) "µ Slip Characteristic Estimator", λ,µ-Curve Estimator" Component

Using the offset-corrected longitudinal acceleration of the vehicle $a_{x,sensor,corr}$, the coefficient of friction used $\mu_{used}$ can be calculated and the coefficient of friction can be divided among the four wheels depending on the type of drive (two-wheel drive, all-wheel-center differential). Based on a parameterized tire characteristic and using the coefficients of friction used $\mu_{used,i}$ and the calculated slips $\lambda_i$ of the wheels from 4, the parameters $c_0$, $c_1$ and $c_2$ of the reference characteristic are determined by a least squares method and the maximum coefficients of friction $\mu_{max, i}$ are also determined therefrom. The model coefficients of friction $\mu_{model, i}$ and the associated peripheral wheel forces $$F_{x,i} = F_{n,i} \mu_{model,i}$$

can be derived from the characteristic obtained depending on the slips.

3) "Revolution Rate Estimator" Component

By analysis of the engine torque signal $T_{eng}$, the revolution rate signals $\omega_i$, the estimated vehicle acceleration $a_{ref}$ from 7, of the estimated gradient angle $\gamma_{ref}$ from 1, the determined peripheral tire forces $F_{x, i}$ and the tire properties (slip curve) from 2, the noise-reduced wheel speeds $\tilde{\omega}_i$ are determined by means of a stochastic estimating method (e.g. Extended Kalman Filter) taking into account the drive train model (incl. the tire dynamics model).

4) "Slip Calculation" Component

The wheel slips $\lambda_i$ are calculated using the estimated vehicle speed $v_{ref}$ from 7 and the estimated wheel revolution rates $\tilde{\omega}_i$ from 3.

5) "Model-Acceleration" Component

A model vehicle acceleration $a_{x,model}$ is calculated from the sum of the estimated tire forces $F_{x, i}$ from 2 by division by the mass.

6) "Slip Adjusted Wheel Speeds" Component

The estimated slips $\lambda_i$ from 4 are subtracted from the measured wheel speeds $\omega_i$ and the wheel speeds $\tilde{v}_{wh, i}$ corresponding to the vehicle speed and adjusted for slip are thus calculated.

7) "Fusion Filter" Component

In a stochastic fusion filter (e.g. Kalman filter), the vehicle speed $V_{ref}$ and the vehicle acceleration $a_{ref}$ are estimated from the following information by means of a linear dynamic model:

$\tilde{v}_{wh, i}$ of the component 6), the measured vehicle acceleration $a_{x,sensor}$, after subtracting the effect of the gradient angle $\gamma_{ref}$, and the model vehicle acceleration $a_{x,model}$ from the component 5).

The entire framework undergoes stochastic signal processing. This means that in addition to the estimated signals themselves the components also transfer the fuzziness of the estimated signals (confidence intervals), which are taken into account in the further signal processing. As can be seen, the number of measurements is greater than the number of states and the structure of the Kalman filter enables measurement signals to be fused together with pseudo measurement signals. The Kalman filter filters the most trustworthy information from the redundant speed signals and acceleration signals using the signal noise.

The invention claimed is:

1. A vehicle reference speed determination method, comprising the steps of:
   receiving, by a vehicle controller, sensor signals from vehicle sensors;
   determining, by a first stochastic estimator of the vehicle controller, angular speeds of wheels on a first axle of the vehicle based at least in part on the sensor signals;
   determining, by a second stochastic estimator of the vehicle controller, angular speeds of wheels on a second axle of the vehicle based at least in part on the sensor signals;
   determining, by a third stochastic estimator of the vehicle controller, a speed of the vehicle by fusing driving state signals in a fusion model while incorporating respective weighting factors, the driving state signals based at least in part on the angular speeds of the wheels on the first axle and the second axle
   wherein the stochastic estimators are selected in accordance with a physical model based on a behavior of the vehicle.

2. The method as claimed in claim 1, wherein the fusion model is structured in at least two hierarchically structured model calculation levels, wherein each model calculation level models a sub region of a vehicle and each level comprises at least one stochastic estimator.

3. The method as claimed in claim 2, wherein besides stochastic estimators the fusion model additionally comprises a further stochastic estimator, that works according to the least squares method, and/or a physical computer model.

4. The method as claimed in claim 1, wherein besides stochastic estimators the fusion model additionally comprises a further stochastic estimator, that works according to the least squares method, and/or a physical computer model.

5. The method as claimed in claim 1, wherein the driving state signals are derived from the
   ESC-driving state sensors, selected from the group consisting of:
   i) wheel speeds ($\omega_i$) and the
   ii) vehicle longitudinal acceleration ($a_{x,sensor}$),
   which comprise
   the vehicle longitudinal speed ($v_{ref}$),
   the vehicle longitudinal acceleration ($a_{ref}$) and the
   road gradient angle ($\gamma_{ref}$).

6. The method as claimed in claim 1, wherein the model calculation levels comprise the levels
   vehicle model,
   tire model and
   drive train model,
wherein the vehicle model is a longitudinal dynamic model of the vehicle.

7. The method as claimed in claim 1, wherein a wheel-specific slip curve estimation is used for determining the parameters of the tire characteristics.

8. The method as claimed in claim 1, wherein a stochastic estimator is used for each axle that determines the slip adjusted wheel speeds from the measured wheel speeds and the estimated vehicle speed.

9. The method as claimed in claim 1, wherein a determination of the vehicle speed and vehicle longitudinal acceleration is carried out, during which the following are used
   a stochastic estimator with linear dynamics for the fusion of a measured vehicle acceleration, compensated for long-term offset and gradient,
   a vehicle acceleration calculated from the model, and
   four wheel speeds adjusted for slip.

10. The method as claimed in claim 1, wherein determination of a model vehicle acceleration ($a_{x,model}$) is carried out based on the circumferential forces from the tire characteristics and the vehicle mass based on a vehicle longitudinal model.

11. The method as claimed in claim 1, wherein a stochastic determination or estimation of the road gradient is carried out from the measured vehicle acceleration and the estimated vehicle acceleration.

12. A vehicle controller, implementing the method according to claim 1.

* * * * *